United States Patent
Gomez et al.

(10) Patent No.: US 9,303,513 B2
(45) Date of Patent: Apr. 5, 2016

(54) TURBOMACHINE

(71) Applicant: MTU Aero Engines GmbH, Munich (DE)

(72) Inventors: Sergio Elorza Gomez, Munich (DE); Tim Schneider, Dachau (DE)

(73) Assignee: MTU Aero Engines GmbH, Munich (DE)

( * ) Notice: Subject to any disclaimer, the term of this patent is extended or adjusted under 35 U.S.C. 154(b) by 511 days.

(21) Appl. No.: 13/760,591

(22) Filed: Feb. 6, 2013

(65) Prior Publication Data

US 2013/0209223 A1    Aug. 15, 2013

(30) Foreign Application Priority Data

Feb. 10, 2012  (EP) .................... 12154927

(51) Int. Cl.
| | |
|---|---|
| *F01D 5/14* | (2006.01) |
| *F01D 1/04* | (2006.01) |
| *F01D 9/04* | (2006.01) |
| *F04D 29/54* | (2006.01) |

(52) U.S. Cl.
CPC ........ *F01D 1/04* (2013.01); *F01D 5/146* (2013.01); *F01D 9/041* (2013.01); *F04D 29/544* (2013.01); *F05D 2240/40* (2013.01); *F05D 2270/17* (2013.01); *Y02T 50/673* (2013.01)

(58) Field of Classification Search
CPC ......... F01D 5/141; F01D 5/142; F01D 5/143; F01D 5/145; F01D 1/04; F01D 5/146; F01D 9/041; F04D 29/544; Y02T 50/673; F05D 2240/40; F05D 2270/17
USPC ......................................... 416/198 A
See application file for complete search history.

(56) References Cited

U.S. PATENT DOCUMENTS

| | | | | |
|---|---|---|---|---|
| 3,937,592 | A | * | 2/1976 | Bammert ............... 415/194 |
| 8,534,997 | B2 | * | 9/2013 | Guemmer ............... 415/181 |
| 2010/0303629 | A1 | | 12/2010 | Guemmer |

FOREIGN PATENT DOCUMENTS

| | | |
|---|---|---|
| DE | 3924829 | 2/1991 |
| EP | 2261463 A2 | 12/2010 |
| GB | 2235734 | 3/1991 |

* cited by examiner

*Primary Examiner* — Christopher Verdier
*Assistant Examiner* — Aaron R Eastman
(74) *Attorney, Agent, or Firm* — Davidson, Davidson & Kappel, LLC

(57) ABSTRACT

A turbomachine including at least one blade-row group that is arranged in the main flow path and at least two rows of blades that are adjacent to each other in the main flow direction, each row having a plurality of blades, whereby the trailing edges of the blades of the upstream row of blades and the leading edges of the blades of the downstream row of blades are arranged at an axial edge distance that decreases from the center of the main flow path in the direction of at least one main flow limiter.

4 Claims, 6 Drawing Sheets

TURBOMACHINE

This claims the benefit of European Patent Application EP 12154927.3, filed Feb. 10, 2012.

The invention relates to a turbomachine.

BACKGROUND

The maximum deflection of a row of blades of a turbomachine and thus its aerodynamic load capacity are limited, for one thing, by a separation of the flow along the blade profile. For another thing, the maximum deflection is limited by a separation of a boundary-layer flow on the side walls on the hub side and on the housing side. Double-row blade arrangements are known for purposes of increasing the deflection capacity of rows of blades. A prior-art turbomachine having such an arrangement is shown in FIG. 1. This turbomachine has a hub 2 that is mounted in a housing 4 so as to rotate around a rotor axis 6 that extends in the lengthwise direction x. The hub 2 and the housing 4 delimit an annular main flow path 8 which is traversed from left to right as depicted by the horizontal arrow and in which, for example, a blade-row group 10 on the rotor side, a blade-row group 12 on the stator side and a variable blade-row group 14 are arranged. The blade-row groups 10, 12, 14 each have two rows of blades arranged one after the other in the flow direction, each having a plurality of blades 16, 18. For the sake of clarity, primarily the blade-row group 10 on the rotor side has been provided with reference numerals below. The blade-row group 10 on the rotor side and the blade-row group 12 on the stator side are each firmly joined to the hub 2 and to the housing 4, respectively, whereby a clearance 20 is formed between the tips of the blades 16, 18 and the housing 4 or the hub 2. The blades 16, 18 of the variable blade-row group 14 are each mounted at their ends on a rotary disk 22, 24 and can be pivoted around a transversal axis 26 as depicted by the arrow indicating the rotation. The front blades 16 each have a trailing edge 28 facing the rear blades 18. The rear blades 18 each have a leading edge 30 facing the front blades 16. The edges 28, 30 are configured rectilinearly and they extend radially almost perpendicular to the main flow direction, so that a constant axial edge distance $D_{const}$ is formed between the edges 28, 30 and thus between the blades 16, 18. Moreover, FIG. 1 shows a blade 32 of an individual row of rotor blades.

However, it has been found that, in the side wall area, that is to say, in the area of the hub 2 and/or of the housing 4, the influence of the boundary layer calls for blade contouring that diverges from the center 34 of the main flow path, and by means of this contouring, the flow conditions in the side-wall area that differ from those of the center 34 of the main flow path can be taken into account. Therefore, when it comes to blade-row groups, European patent application EP 2 261 463 A2 proposes to set a meridional distance between the trailing edges of the front blades and the leading edges of the rear blades in such a way that this distance increases from the center of the main flow path in the direction of a side wall on the hub side or housing side.

SUMMARY OF THE INVENTION

It is an object of the present invention to provide a turbomachine with optimized flow characteristics.

The present invention provides a turbomachine comprising at least one blade-row group that is arranged in the main flow path and at least two rows of blades that are adjacent to each other in the main flow direction, each row having a plurality of blades. According to the invention, the trailing edges of the blades of the upstream row of blades and the leading edges of the blades of the downstream row of blades are arranged at an axial edge distance that decreases from the center of the main flow path in the direction of at least one main flow limiting means.

Owing to the axial edge distance, which decreases starting at the center of the main flow path in the direction of at least one main flow limiting means, the positioning of the blades relative to each other and their interaction are adapted to the main flow in the side wall area, thus promoting a separation-free flow through the rows of blades. The axial edge distance is not constant, but rather, it is configured so as to vary, whereby, according to the invention, between the center of the main flow path and the main flow limiting means, it acquires a value that is smaller than its value at the center of the main flow path. In other words, due to the radial change of the blade arrangement—namely its axial overlap or distance according to the invention—changed flow edge conditions in the side wall area are taken into account and separations of the flow in the side wall area are reduced.

In one embodiment, the edge distance decreases steadily in the direction of a minimum that is at the main flow limiting means.

In one alternative embodiment, the edge distance decreases to a minimum and then increases in the direction of the main flow limiting means.

In this context, in the alternative embodiment, the edge distance at the at least one main flow limiting means is equal to or smaller than the edge distance in the center of the main flow path.

In another embodiment, the edge distance decreases to a minimum and then it remains constant up to the at least one main flow limiting means.

In all of the embodiments, the varying edge distance can be achieved in that the trailing edges have a linear configuration and the leading edges have a curved configuration.

As an alternative, the trailing edges can have a curved configuration and the leading edges can have a rectilinear configuration.

Moreover, as an alternative, the trailing edges and the leading edges can have a curved configuration.

Furthermore, the trailing edges and/or the leading edges can have at least one curved section as well as at least one linear or rectilinear section, so that they have at least one curved configuration or edge section as well as at least one linear configuration or edge section.

In one embodiment, the edge distance decreases in the direction of both main flow limiting means.

In the last embodiment here, the edge configuration can be identical or else can vary in the direction of the main flow limiting means.

In order to take into account any possible asymmetry of the edge configurations in the direction of the main flow limiting means on the rotor side and of the main flow limiting means on the stator side, the trailing edges and the leading edges can intersect the center of the main flow path at an angle $\phi=90°$ or $\phi \neq 90°$.

Other advantageous embodiments of the invention are the subject matter of additional subordinate claims.

BRIEF DESCRIPTION OF THE DRAWINGS

Preferred embodiments of the invention will be explained in greater detail below on the basis of schematic depictions. The following is shown.

DETAILED DESCRIPTION

Figure 1:
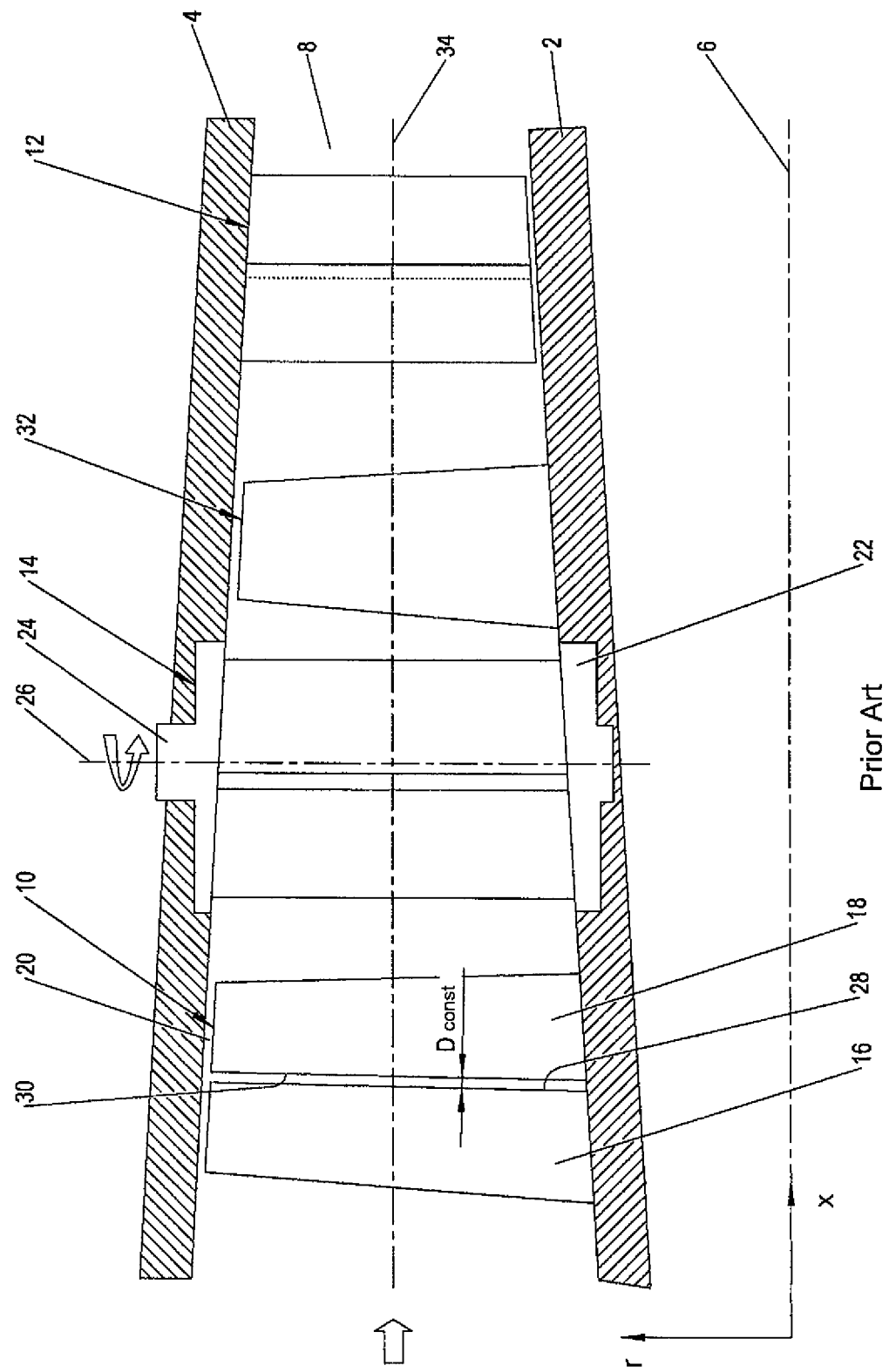
FIG. 1 a longitudinal section through a main flow path of a prior-art turbomachine, FIG. 2 a definition of an axial edge distance as set forth in the invention, FIG. 3 embodiments of a blade-row group according to the invention, FIG. 4 other embodiments of the blade-row group according to the invention, FIG. 5 another embodiment of a blade-row group according to the invention, and FIG. 6 additional embodiments of a blade-row group according to the invention.
Figure 2:
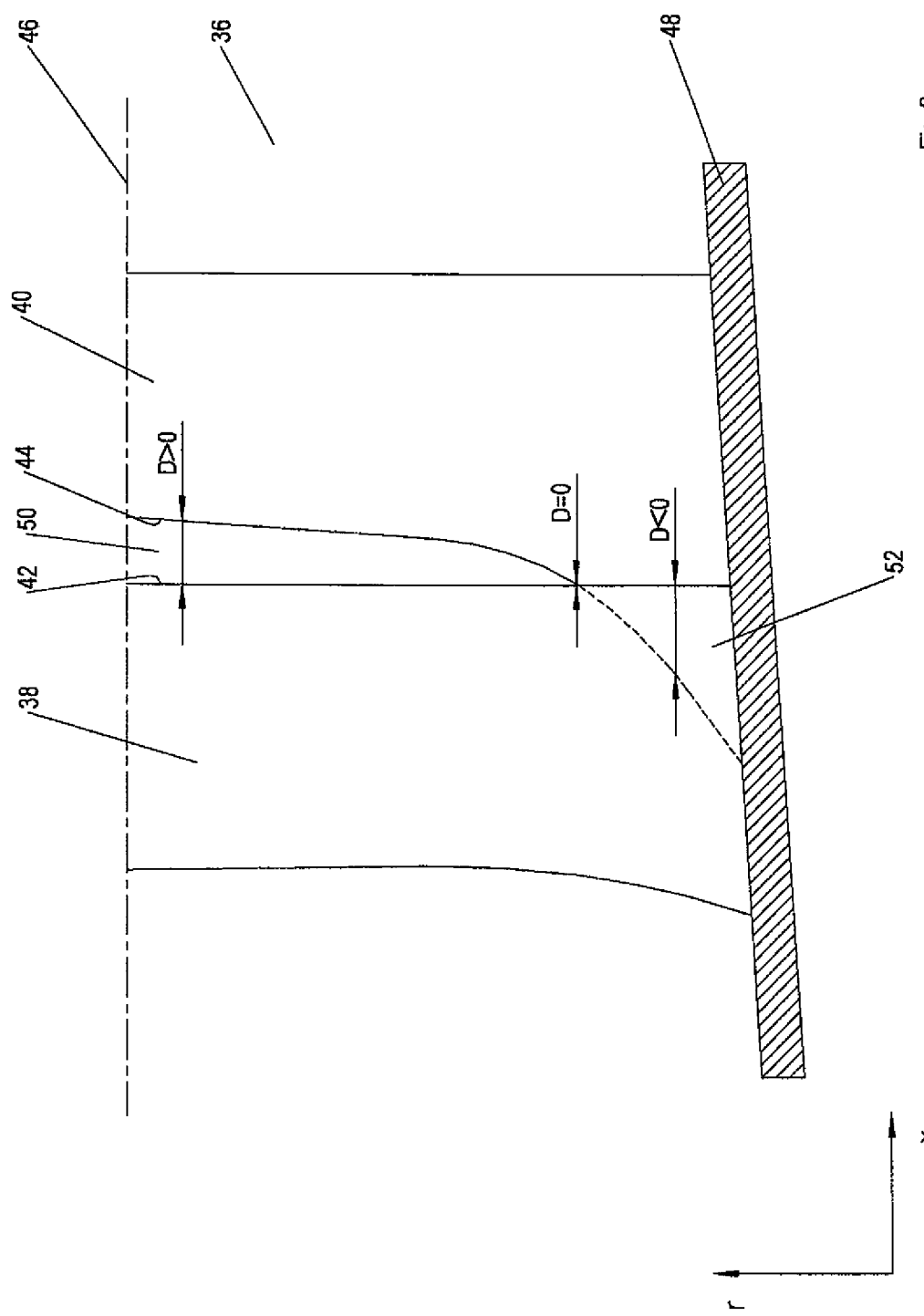

FIG. 2 shows a longitudinal section through a main flow path 36 of a turbomachine, for instance, a stationary gas turbine or an aircraft engine, in order to elucidate an inventive axial edge distance D of a blade-row group. The blade-row group has at least two rows of blades that are adjacent to each other in the main flow direction, each row having a plurality of blades 38, 40 at least partially circumferentially spaced apart. The edge distance D is reduced in the axial direction and thus in the main flow direction between a trailing edge 42 of the upstream or front blade 38 and a leading edge 44 of the downstream or rear blade 40. According to the invention, the edge distance D decreases from the center 46 of the main flow path or from the center line of intersection by at least one area of the radial height of the main flow path 36 in the direction of at least one main flow limiting means 48. The main flow limiting means or main flow limiter 48 constitutes an area of the turbomachine on the hub side or housing side, defining two main flow limiters, and it is, for example, directly a hub section or housing section or a blade shroud band.

The axial edge distance D can acquire values greater than zero (positive values D>0), equal to zero (D=0) or smaller than zero (D<0). When the edge distance D acquires positive values, an axial free space 50 is formed between the edges 42, 44. When the edge distance D acquires negative values, the blades 38, 40 overlap 52. The term "decrease" refers to a reduction of the positive values as well as to a transition from the positive to the negative values as well as to a quantitative increase in the negative values. The configuration of the edges 42, 44 in the direction of the main flow path limiting means 48 can vary, although the edge distance D on the center 46 of the main flow path is always greater than in an area between the center 46 of the main flow path and at least one of the two main flow path limiting means 48.

Figure 3:
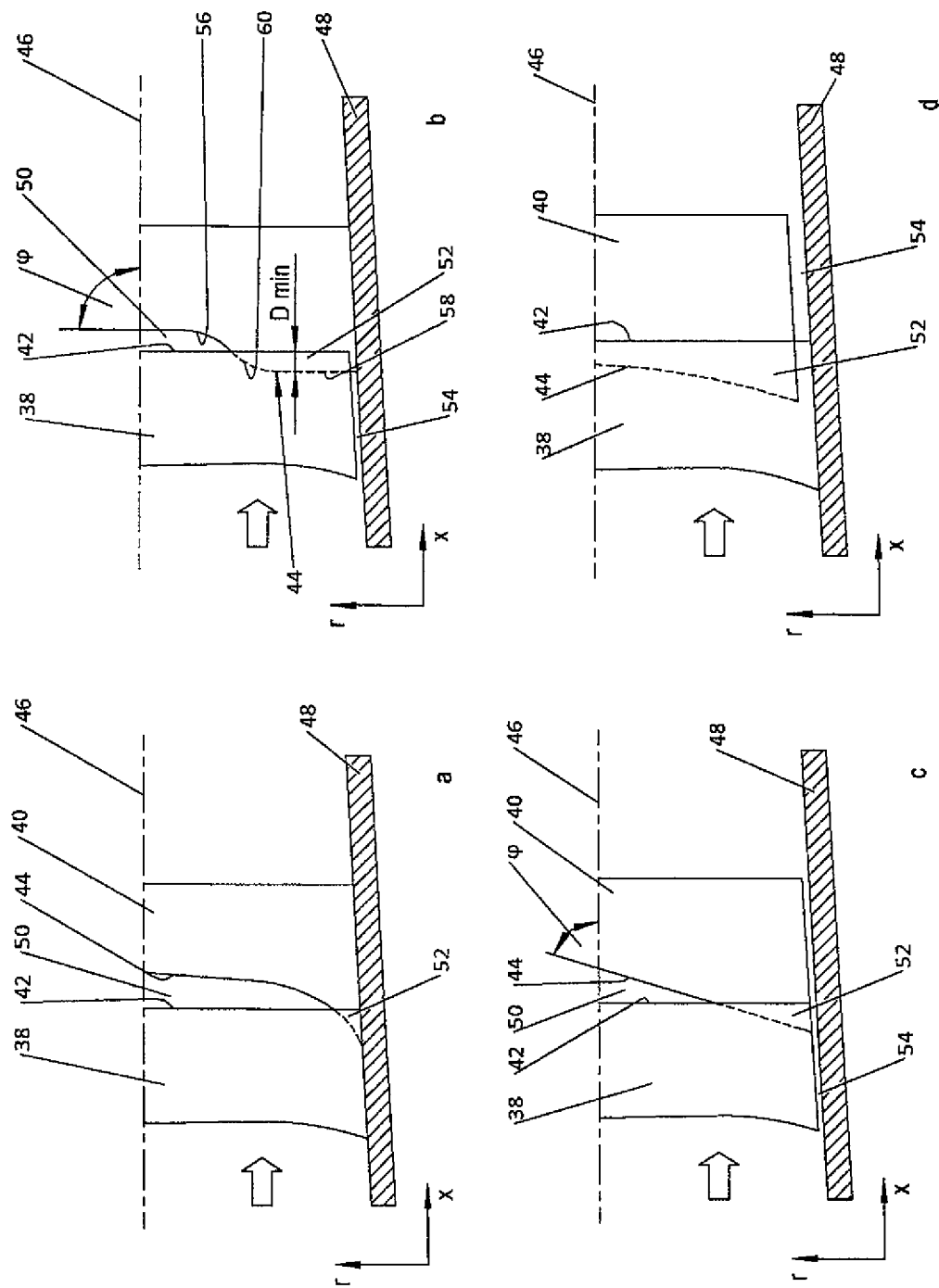

FIG. 3 shows four embodiments of the blade-row group according to the invention. In the embodiments shown in segments a, b, c, and d, the trailing edge 42 of each front blade 38 is rectilinear and oriented so as to run radially perpendicular to the center 46 of the main flow path. The leading edge 44 of each rear blade 40 has a curved configuration or, in case of a rectilinear configuration, has an angle of incidence $\phi \neq 90°$ relative to the center 46 of the main flow path.

In the embodiment shown in segment a, the blades 38, 40 are arranged in the radial direction so as to be clearance-free with respect to the main flow limiting means 48. The leading edge 44 of each rear blade 40 is configured so as to be curved, whereby it is oriented upstream starting at the center 46 of the main flow path in the direction of the main flow limiting means 48. Its radius of curvature decreases steadily in the direction of the main flow limiting means 48. In particular, the edges 42, 44 in the area of the center 46 of the main flow path are at a distance from each other by an axial free space 50, so that the axial edge distance D acquires positive values. Due to the curved configuration, the edge distance D decreases in the direction of the main flow limiting means 34, whereby the blades in the area of the main flow limiting means 48 form an axial overlap 52. Here, the axial edge distance D acquires its minimum value $D_{min}$ directly at the main flow limiting means 48.

In the embodiment shown in segment b, the front blades 38 are at a distance from the main flow limiting means 48 by a radial clearance 54. The rear blades 40 are arranged so as to be clearance-free with respect to the main flow limiting means 48. The leading edge 44 of each rear blade 40 has a curved configuration with a rectilinear radially outer section 56, a rectilinear radially inner section 58 and a curved section 60.

The rectilinear sections 56, 58 are arranged so as to be parallel to the trailing edge 42 of each front blade 38 perpendicular to the center 46 of the main flow path. In particular, the radially outer section 56 is oriented at an angle $\phi = 90°$ relative to the center 34 of the main flow path. An axial free space 50 is formed between the inner section 56 and the trailing edge 42, so that the edge distance D acquires positive values. Owing to the parallel orientation of the outer section 56 with respect to the trailing edge 42, the edge distance D not only acquires its maximum value at the center 46 of the main flow path, but also is constantly at a maximum over the entire free space 50. The inner section 58 is arranged upstream from the outer section 56 in such a way that the blades 38, 40 form an axial overlap 52 and consequently, the edge distance D acquires negative values. Owing to the parallel orientation of the inner section 58 with respect to the trailing edge 42, the axial edge distance D is constant over the entire inner section 58, so that the minimum edge distance $D_{min}$ does not constitute a local minimum, but rather is constantly at a minimum over practically the entire overlap 52.

The two sections 56, 58 are connected at approximately half the radial height between the center 46 of the main flow path and the main flow limiting means 48 by means of the curved section 60 which, for this purpose, is oriented upstream starting at the outer section 56 in the direction of the main flow limiting means 48.

In the embodiment shown in segment c, the front blades 38 and the rear blades 40 are at a distance from the main flow limiting means 48 by a radial clearance 54. The leading edge 44 of each rear blade 40 is configured so as to be rectilinear. Starting at the center 46 of the main flow path in the direction of the main flow limiting means 48, the leading edge 44 has an angle of incidence $\phi \neq 90°$ upstream perpendicular to the center 46 of the main flow path. In particular, starting at the center 46 of the main flow path, an axial free space 50 is formed between the edges 38, 40, said free space 50 tapering like a wedge in the direction of the main flow limiting means 48 and thus closing. The axial edge distance D acquires ever-smaller positive values, whereby at approximately half the radial height area, the edge distance acquires the value zero and the axial free space 50 is closed. After the free space 50 has closed, the blades 42, 44 form an axial overlap 52. Over its further course in the direction of the main flow limiting means 48, the axial edge distance D acquires ever-greater negative values, as a result of which the overlap 52 acquires a triangular shape and the minimum edge distance $D_{min}$ is close to the main flow limiting means 48.

In the embodiment shown in segment d, the front blades 38 are arranged so as to be clearance-free with respect to the main flow limiting means 48. The rear blades 40 are at a distance from the main flow limiting means 48 by a radial clearance 54. The leading edge 44 of the rear blades 40 has a curved configuration with an approximately constant radius of curvature. The leading edge 40 is oriented upstream starting at the center 46 of the main flow path in the direction of the main flow limiting means 48. An essential difference from the embodiment shown in segment a is that an overlap 52 of the blades 42, 44 is already formed at the center 46 of the main flow path. Therefore, the axial edge distance D already has a negative value at the center 46 of the main flow path, said value increasing due to the curved, upstream configuration in the direction of the main flow limiting means 48. Consequently, the minimum axial edge distance $D_{min}$ is close to the main flow limiting means 48.

Figure 4:
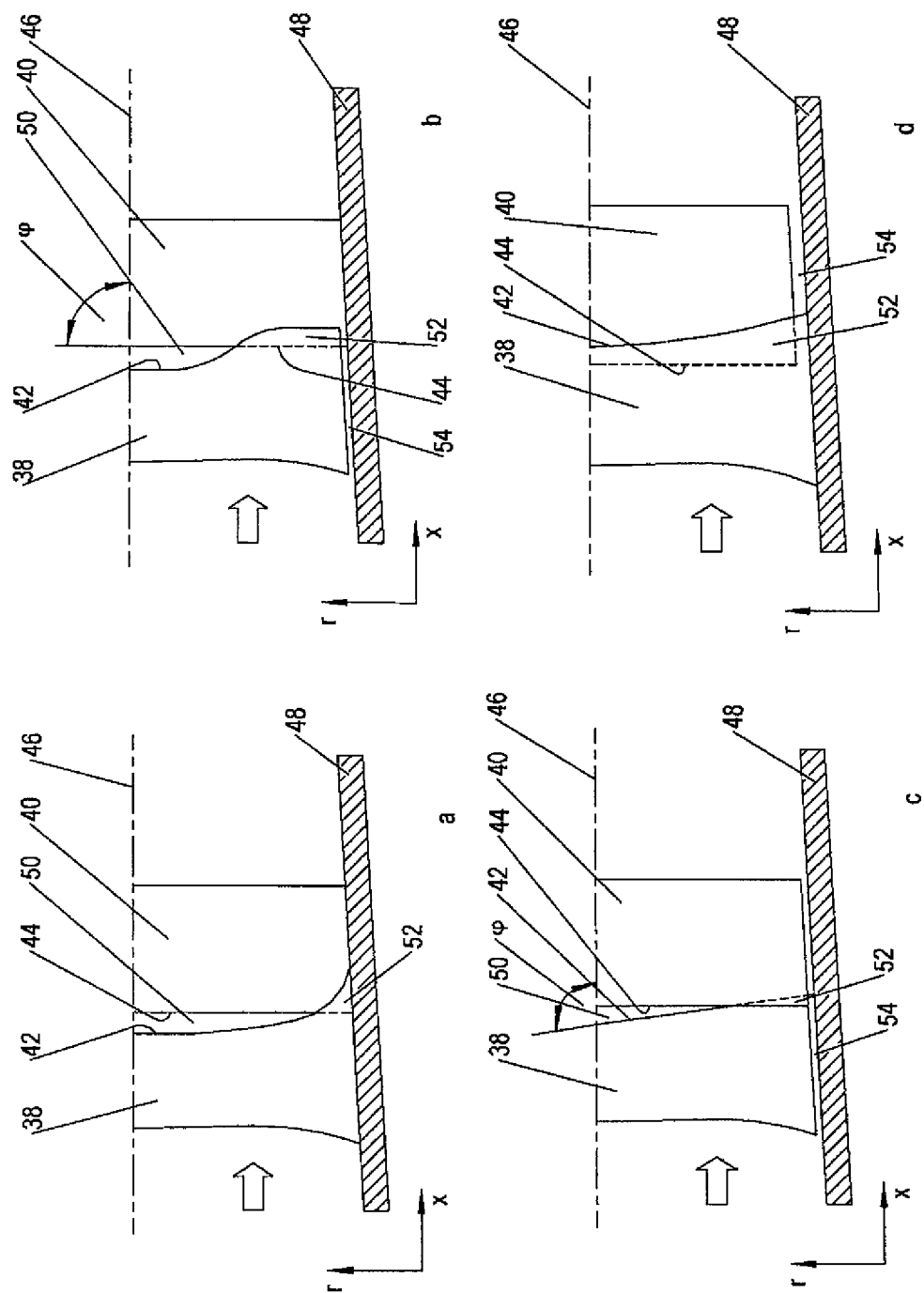

FIG. 4 shows four additional embodiments of the blade-row group according to the invention. In the embodiments shown in segments a, b, c, and d, the trailing edge 42 of each front blade 38 has a curved configuration or, in the case of a rectilinear configuration, has an angle of incidence $\phi \neq 90°$. The leading edge 44 of each rear blade 40 is rectilinear and oriented radially so as to run almost perpendicular to the center 46 of the main flow path. In contrast to the blade-row groups according to FIG. 3, in the blade-row groups according to FIG. 4, the configuration of the edges 42, 44 for each segment a, b, c, d has been switched, so that further detailed elaborations are not needed. It should merely be pointed out that, due to this switch of the curved configurations, the trailing edges 42 are oriented downstream starting at the center 46 of the main flow path in the direction of the main flow limiting means 48. The position of the appertaining axial minimum edge distance $D_{min}$ remains unaffected by the switch, so that in the embodiment shown in segment a, the minimum edge distance $D_{min}$ is formed at the main flow limiting means 48; in the embodiment shown in segment b, it is formed over almost the entire overlap 52; in the embodiment shown in segment c, it is formed close to the main flow limiting means 48; and in the embodiment shown in segment d, it is likewise formed close to the main flow limiting means 48.

Figure 5:
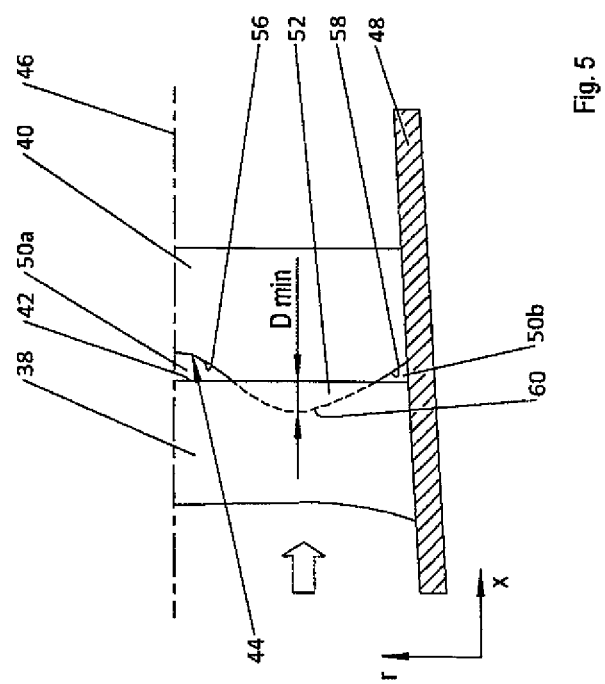

In the embodiment of a blade-row group according to the invention shown in FIG. 5, the blades 38, 40 are arranged in the radial direction so as to be clearance-free with respect to the main flow limiting means 48. The trailing edge 42 of each front blade 38 is rectilinear and oriented so as to run radially perpendicular to the center 46 of the main flow path. The leading edge 44 of each rear blade 40 has a curved and especially a bulbous configuration. In the area of the center 46 of the main flow path and in the area of the main flow limiting means 48, an axial radially outer free space 50a and an axial inner free space 50b are created between the edges 42, 44. In this manner, the edge distance D acquires positive values here, whereby the edge distance acquires a maximum value at the center 46 of the main flow path. Therefore, the outer free space 50a has a larger axial extension than the inner free space 50b.

The two free spaces 50a, 50b are separated from each other by an axial bulbous overlap 52 of the two blades 38, 40 in the radial direction. Consequently, the axial edge distance D acquires negative values between the free spaces 50a, 50b, whereby a minimum edge distance $D_{min}$ is formed at half the height between the main flow limiting means 48 and the center 46 of the main flow path. For purposes of forming the overlap 52, the leading edge 42 has a curved section 60 that is oriented upstream with respect to the adjacent edge sections 56, 58.

Figure 6:
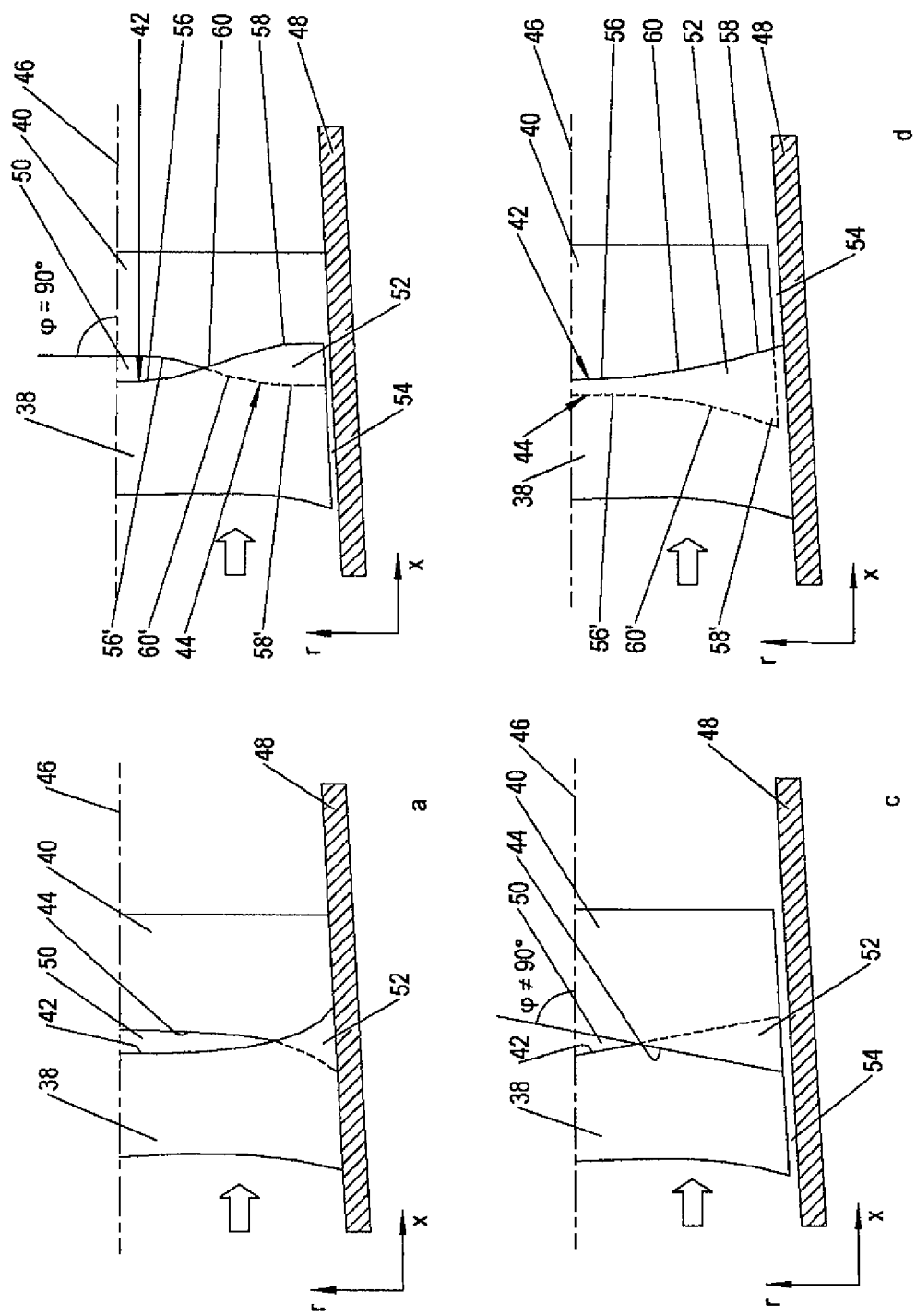

FIG. 6 shows four additional embodiments of the blade-row group according to the invention. In the embodiments shown in segments a, b, c, and d, in contrast to the preceding embodiments, the trailing edges 42 as well as the leading edges 44 are provided with an edge variation or else, in the case of a rectilinear configuration, they have an angle of incidence $\phi \neq 90°$ relative to the center 46 of the main flow path.

In the embodiment shown in segment a, the blades 38, 40 are arranged so as to be clearance-free with respect to the main flow limiting means 48. The trailing edge 42 of each front blade 38 is curved, whereby it is oriented downstream starting at the center 46 of the main flow path in the direction of the main flow limiting means 48. The leading edge 44 of each rear blade 40 is configured so as to be curved, whereby it is oriented upstream starting at the center 46 of the main flow path in the direction of the main flow limiting means 48. The radius of curvature of the trailing edges 42 and of the leading edge 44 decreases steadily in the direction of the main flow limiting means 48. Moreover, the edges 42, 44 in the area of the center 46 of the main flow path are at a distance from each other by an axial free space 50, so that the axial edge distance acquires positive values. Due to the curved configuration of both edges 42, 44, the edge distance D decreases in the direction of the main flow limiting means 34, whereby the blades 38, 40 form an axial overlap 52 in the area of the main flow limiting means 48. In this context, the axial edge distance D acquires its minimum value $D_{min}$ directly at the main flow limiting means 48.

In the embodiment shown in segment b, the front blades 38 are at a distance from the main flow limiting means 48 by a radial clearance 54. The rear blades 40 are arranged so as to be clearance-free with respect to the main flow limiting means 48. The trailing edges 42 of the front blades 38 and the leading edges 44 of the rear blades 40 each have a curved configuration with a rectilinear radially outer section 56, 56', a rectilinear radially inner section 58, 58' and a curved section 60, 60'.

The rectilinear sections 56, 56' and 58, 58' are arranged so as to run parallel to each other and perpendicular to the center 46 of the main flow path. In particular, the radially outer section 56, 56' is oriented at an angle $\phi = 90°$ relative to the center 34 of the main flow path. An axial free space 50 is formed between the inner sections 56, 56', so that the edge distance D acquires positive values. Owing to the parallel orientation of the outer sections 58, 58', the edge distance D acquires its maximum value not only at the center 46 of the main flow path but rather, in principle it is also constantly at a maximum over the entire free space 50. The inner section 58 of the front blade 38 is arranged downstream from the outer section 56 of the front blade 38. The inner section 58' of the rear blade 40 is arranged upstream from the inner section 56' of the rear blade 40. Therefore, in the embodiment shown, the inner section 58 of the front blade 38 is arranged downstream from the inner section 58' of the rear blade 40. Due to the thus formed offset of the inner sections 58, 58' with respect to each other, they form an axial overlap 52 with a negative edge distance D. The overlap 52 is such that the magnitude of the edge distance D in the area of the inner sections 58, 58' is greater than the edge distance D in the area of the outer sections 58, 58'. Owing to the parallel orientation of the inner sections 58, 58', the axial edge distance D is constant over the entire inner sections 58, 58', so that the minimum edge distance $D_{min}$ is not a local minimum, but rather is at a constant minimum over practically the entire overlap 52.

The two sections 56, 56' and 58, 58' are connected approximately at about half the radial height between the center 46 of the main flow path and the main flow limiting means 48 by means of the curved sections 60, 60' which, for purposes of forming the overlap 52, are oriented downstream (curved section 60 of the front blade 38) or upstream (curved section 60' of the rear blade 40) starting at the appertaining outer section 56, 56' in the direction of the main flow limiting means 48.

In the embodiment shown in segment c, the front blades 38 and the rear blades 40 are each at a distance from the main flow limiting means 48 by a radial clearance 54. Their trailing edges 42 and leading edges 44 are each configured rectilinearly and have an angle of incidence $\phi \neq 90°$ perpendicular to the center 46 of the main flow path. In the embodiment shown, the trailing edges 42 are oriented downstream and the leading edges 44 are oriented upstream, both by angles of the same magnitude, starting at the center 46 of the main flow path in the direction of the main flow limiting means 48. Starting at the center 46 of the main flow path, an axial free space 50 is formed between the edges 38, 40, said free space 50 tapering like a wedge in the direction of the main flow limiting means 48 and thus closing. The axial edge distance D acquires ever-smaller positive values, whereby after approximately one-third of the radial height area between the center 46 of the main flow path and the main flow limiting means 48, the edge distance D acquires the value zero and the axial free space 50 is thus closed. After the free space 50 has closed, the blades 38, 40 or their edges 42, 44 form an axial overlap 52. Over its further course in the direction of the main flow limiting means 48, the axial edge distance D acquires ever-greater negative values, whereby, due to the rectilinear configuration of the edges 42, 44 and to their identical angles of incidence relative to the center 46 of the main flow path, the overlap 52 is configured as an isosceles triangle and the minimum edge distance $D_{min}$ is close to the main flow limiting means 48.

In the embodiment shown in segment d, the front blades 38 are arranged so as to be clearance-free with respect to the main flow limiting means 48. The rear blades 40 are at a distance from the main flow limiting means 48 by a radial clearance 54. The trailing edges 42 of the front blades 38 and the leading edges 44 of the rear blades 40 each have a curved configuration with a rectilinear radially outer section 56, 56', a rectilinear radially inner section 58, 58' and a curved section 60, 60'. The axial positioning of the blades 38, 40 with respect to each other and their curved configurations are such that an overlap 52 is already formed at the center 46 of the main flow path, said overlap 52 then increasing as it extends to the radial clearance 54. Therefore, the axial edge distance D already has a negative value at the center 46 of the main flow path, said value increasing in the direction of the main flow limiting means 48. Consequently, the minimum axial edge distance $D_{min}$ is close to the main flow limiting means 48.

Each appertaining edge configuration is such that, as seen from the center 46 of the main flow path in the direction of the main flow limiting means 48, the inner sections 56, 56' as well as the outer sections 58, 58' move away from each other. The curved sections 60, 60' are at approximately half the radial height area between the center 46 of the main flow path and the main flow limiting means 48, and are oriented upstream (curved section 60' of the rear blade 40) or downstream (curved section 60 of the front blade 38). Due to the orientation of the inner sections 56, 56', of the outer sections 58, 58' and of the curved sections 60, 60', the trailing edges 42 of the front blades 38 are thus oriented downstream and the leading edges 44 of the rear blades 40 are oriented upstream starting at the center 46 of the main flow path.

This document discloses a turbomachine having at least one blade-row group that is arranged in a main flow path and that, in the main flow direction, has at least two adjacent rows of blades, each with a plurality of blades, whereby the trailing edges of the blades of the upstream row of blades and the leading edges of the blades of the downstream row of blades are arranged at an axial edge distance which decreases starting at the center of the main flow path in the direction of at least one main flow limiting means.

LIST OF REFERENCE NUMERALS 2 hub
4 housing
6 rotor axis
8 main flow path
10 blade-row group on the rotor side
12 blade-row group on the stator side
14 variable blade-row group
16 blade
18 blade
20 clearance
22 rotary disk
24 rotary disk
26 transversal axis
28 trailing edge
30 leading edge
32 blade
34 center of the main flow path
36 main flow path
38 front blade
40 rear blade
42 trailing edge
44 leading edge
46 center of the main flow path
48 main flow limiting means
50, a, b free space
52 overlap
54 radial clearance
56 edge section
58 edge section
60 curved section
D axial edge distance

What is claimed is:

1. A turbomachine comprising:
at least one blade-row group arranged in a main flow path and including an upstream row of blades and a downstream row of further blades adjacent to each other in a main flow direction, trailing edges of the blades of the upstream row and leading edges of the further blades of the downstream row being arranged at an axial edge distance that decreases to a minimum from a center of the main flow path in a direction of at least one main flow limiter and then increases in the direction of the main flow limiter, wherein the edge distance at the main flow limiter is equal to or smaller than the edge distance in the center of the main flow path.

2. The turbomachine as recited in claim 1 wherein the trailing edges of the blades of the upstream row have a linear configuration and the leading edges of the blades of the downstream row have a curved configuration.

3. The turbomachine as recited in claim 1 wherein the trailing edges of the blades of the upstream row and the leading edges of the blades of downstream row intersect the center of the main flow path at an angle $\phi = 90°$.

4. A turbomachine comprising:
at least one blade-row group arranged in a main flow path and including an upstream row of blades and a downstream row of further blades adjacent to each other in a main flow direction, trailing edges of the blades of the upstream row and leading edges of the further blades of the downstream row being arranged at an axial edge distance decreases from a center of the main flow path in a direction of at least one main flow limiter wherein the edge distance decreases to a minimum and then remains constant up to the main flow limiter.

* * * * *